(12) United States Patent
Morris et al.

(10) Patent No.: US 7,975,465 B2
(45) Date of Patent: Jul. 12, 2011

(54) HYBRID ENGINE ACCESSORY POWER SYSTEM

(75) Inventors: Timothy M. Morris, San Diego, CA (US); Wayne R. Spock, Canton, CT (US); Peter Gerard Smith, Wallingford, CT (US); Matthew J. Schryver, Wethersfield, CT (US); Ronald S. Walther, Granby, CT (US); Robert L. Gukeisen, Middletown, CT (US); Edward T. Hagaman, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 605 days.

(21) Appl. No.: 10/694,645

(22) Filed: Oct. 27, 2003

(65) Prior Publication Data

US 2005/0103931 A1   May 19, 2005

(51) Int. Cl.
*F02C 9/28* (2006.01)
*B64D 33/00* (2006.01)
(52) U.S. Cl. ...................... 60/39.282; 244/60
(58) Field of Classification Search ............. 244/60, 244/53 R, 118.5; 60/39.163, 39.15, 791, 60/39.34, 785, 396, 39.282
See application file for complete search history.

(56) References Cited

U.S. PATENT DOCUMENTS

| | | | | |
|---|---|---|---|---|
| 3,006,145 A | | 10/1961 | Sobey | |
| 3,514,945 A | | 6/1970 | Austin | |
| 3,887,147 A | * | 6/1975 | Grieb | 244/208 |
| 4,051,472 A | * | 9/1977 | Albanese et al. | 342/28 |
| 4,175,701 A | * | 11/1979 | Wojciehowski et al. | 239/11 |
| 4,184,154 A | * | 1/1980 | Albanese et al. | 342/107 |
| 4,277,787 A | * | 7/1981 | King | 342/371 |
| 4,686,533 A | * | 8/1987 | MacDonald et al. | 342/373 |
| 4,725,844 A | * | 2/1988 | Goodwin et al. | 342/374 |
| 4,814,773 A | * | 3/1989 | Wechsberg et al. | 342/368 |
| 4,885,589 A | * | 12/1989 | Edward et al. | 342/175 |
| 5,117,633 A | * | 6/1992 | Bayer et al. | 60/431 |
| 5,137,230 A | * | 8/1992 | Coffinberry | 244/118.5 |
| 5,414,992 A | * | 5/1995 | Glickstein | 60/782 |
| 5,694,765 A | | 12/1997 | Hield et al. | |
| 5,709,103 A | * | 1/1998 | Williams | 62/402 |

(Continued)

FOREIGN PATENT DOCUMENTS

GB        2 063 188 A        6/1981

(Continued)

OTHER PUBLICATIONS

"Multicarrier radar signals with low peak-to-mean envelope power ratio", Mozeson, E.; Levanon, N.;Radar, Sonar and Navigation, IEE Proceedings-, vol. 150, Issue: 2, Apr. 2003 Ps:71-77.*
http://en.wikipedia.org/wiki/Torque.*

*Primary Examiner* — Tien Dinh
(74) *Attorney, Agent, or Firm* — Bachman & LaPointe, P.C.

(57) ABSTRACT

A system for generating accessory power from a gas turbine engine is provided by the present invention. The system includes an electronic control device for monitoring at least one parameter which provides information about an incipient change in power demand, a control valve operated by the control device for supplying bleed air from the engine during a transient state in response to the at least one monitored parameter, and a pneumatically operated device for receiving the bleed air and for generating power to operate equipment onboard an aircraft. The pneumatically operated device may be an air turbine or a pneumatically integrated generator.

9 Claims, 6 Drawing Sheets

U.S. PATENT DOCUMENTS

| | | | |
|---|---|---|---|
| 5,752,379 A * | 5/1998 | Schafer et al. | 60/39.24 |
| RE36,095 E * | 2/1999 | Urabe et al. | 342/133 |
| 5,884,873 A * | 3/1999 | Breit | 244/209 |
| 6,164,902 A | 12/2000 | Irwin et al. | |
| 6,369,748 B1 * | 4/2002 | Uehara | 342/70 |
| 6,663,044 B1 * | 12/2003 | Munoz et al. | 244/118.5 |

FOREIGN PATENT DOCUMENTS

| | | |
|---|---|---|
| GB | 2 074 654 A | 11/1981 |
| JP | 2000179360 A | 6/2000 |

* cited by examiner

HYBRID ENGINE ACCESSORY POWER SYSTEM

BACKGROUND OF THE INVENTION (1) Field of the Invention

The present invention relates to a method and a system for generating accessory power from a gas turbine engine. In particular, the present invention relates to a hybrid engine accessory power system that enables improved gas turbine engine operability characteristics.

(2) Prior Art

Horsepower extraction from a gas turbine engine typically incorporates a mechanical gearbox that is driven by a power takeoff shaft that is directly connected to one of the main drive shafts in the engine. The gearbox is mounted in such a way as to facilitate the subsequent attachment of all of the engine-driven accessories such as a fuel pump, an oil pump, a hydraulic pump, electrical generators, etc. The gearbox represents the transfer of gas turbine mechanical shaft power to accessory mechanical shaft power.

Gas turbine engine high pressure compressors operate steady state along an operating line 10 of increasing flow and pressure ratio at increasing rotor speed as shown in FIG. 1. A compressor's limiting operability characteristic is the stall line 12 beyond which stable compressor airflow cannot be sustained. A compressor operating line 10 at a given airflow is lower in pressure ratio than the stall line 12 to provide a margin for engine transient operation. During engine acceleration, the compressor deviates from the steady state operating line 10 and moves along a transient operating line 14. For the typical high-pressure compressor, the transient operating line 14 during acceleration is characterized by reduced stall margin across the engine operating range. Accessory power demand negatively affects transient operation by reducing the amount of stall margin available as illustrated in FIG. 2.

Gas turbine accessory power has been provided by mechanical means through a series of gear sets and transmission shafts attached to the engine's high pressure rotor. Electrical and hydraulic power for airplane systems, along with motive power for the engine oil and fuel pumps, are provided by the engine mounted accessory power train. High levels of shaft power extraction decreases the amount of stall margin available for engine transient operation as depicted in FIG. 2.

There are several options available allowing transient operation within these limitations. The rate of engine acceleration can be slowed; however, this may be incompatible with the demands of aircraft safety during emergency circumstances such as obstacle avoidance. Raising the minimum idle high rotor speed, increasing idle thrust, thereby reducing the idle to max power thrust range, also allows a lower acceleration rate and transient excursion. Again, this may be incompatible with aircraft operation as higher idle speed results in a higher idle thrust, which requires higher airplane drag to descend. Given airplane idle requirements for descent profile and engine thrust response for airplane safety, the compressor transient excursion is essentially fixed, requiring some relief with regard to accessory power effects on the high pressure rotor.

Compressor bleed air can be used to drop the operating line of the compressor away from the surge line. This technique is commonly used; however, it has several drawbacks such as increased engine noise impact, and compatibility of the high temperature exhaust with composite engine cowl structures.

There is a need for a system which simultaneously allows for reduced mechanical shaft power load and systems capacity to absorb and utilize the energy of compressor bleed air at low power.

SUMMARY OF THE INVENTION

Accordingly, it is an object of the present invention to provide a system wherein engine pneumatic power can be used to provide power for operating accessories onboard an aircraft, while improving the gas turbine compressor operating line margin from the compressor surge line.

It is a further object of the present invention to provide a method for using engine pneumatic power to provide power for operating accessories onboard an aircraft, while improving the gas turbine compressor operating line margin from the compressor surge line.

The foregoing objects are attained by the system and method of the present invention.

In accordance with the present invention, a hybrid engine accessory power system is provided. The system broadly comprises means for monitoring at least one parameter which provides information about an incipient change in power demand, means for supplying bleed air from the engine during a transient state in response to the at least one monitored parameter, and a pneumatically operated means for receiving the bleed air and for generating power to operate equipment onboard an aircraft.

Further in accordance with the present invention, a method for generating engine accessory power from a gas turbine engine is provided. The method broadly comprises the steps of monitoring at least one parameter which provides information about an incipient change in power demand, bleeding air from the engine during a transient state in response to the at least one monitored parameter, and supplying the bleed air to a pneumatically operated means for generating power to operate equipment onboard an aircraft.

Other details of the hybrid engine accessory power system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
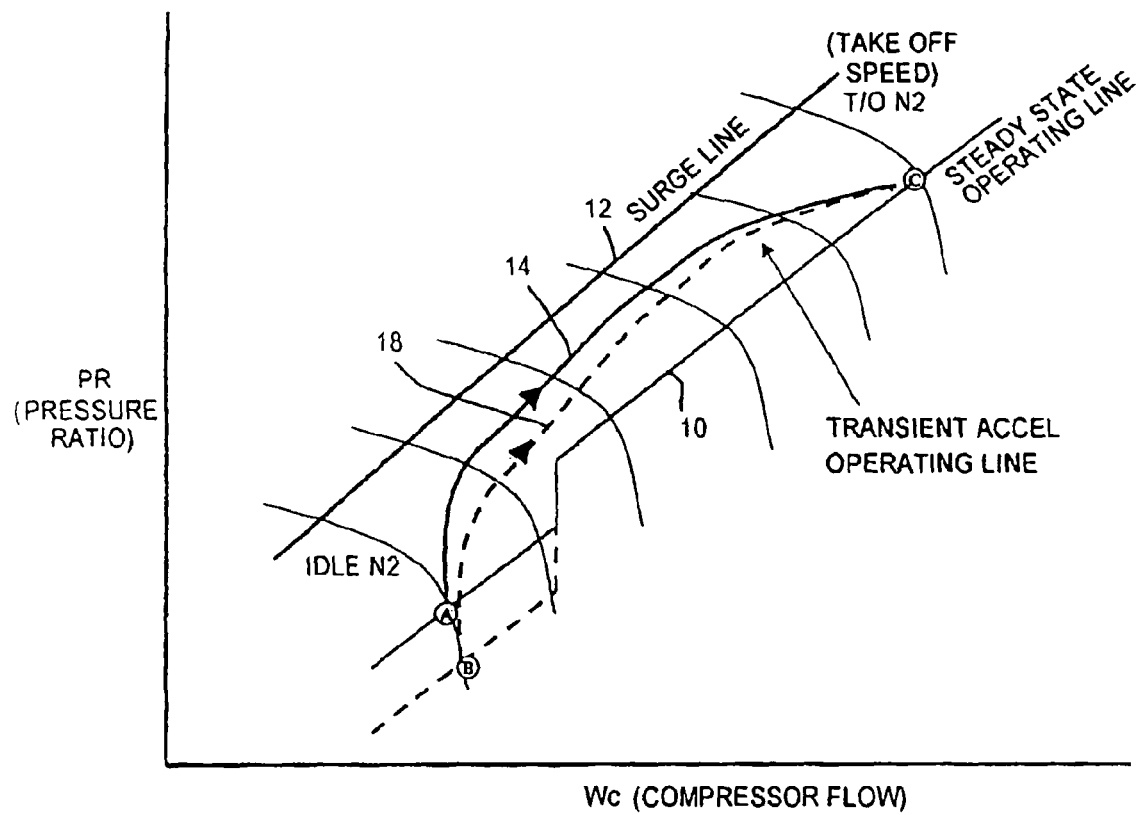
FIG. 1 is a graph illustrating the operating lines and surge lines for a gas turbine engine.
Figure 2:
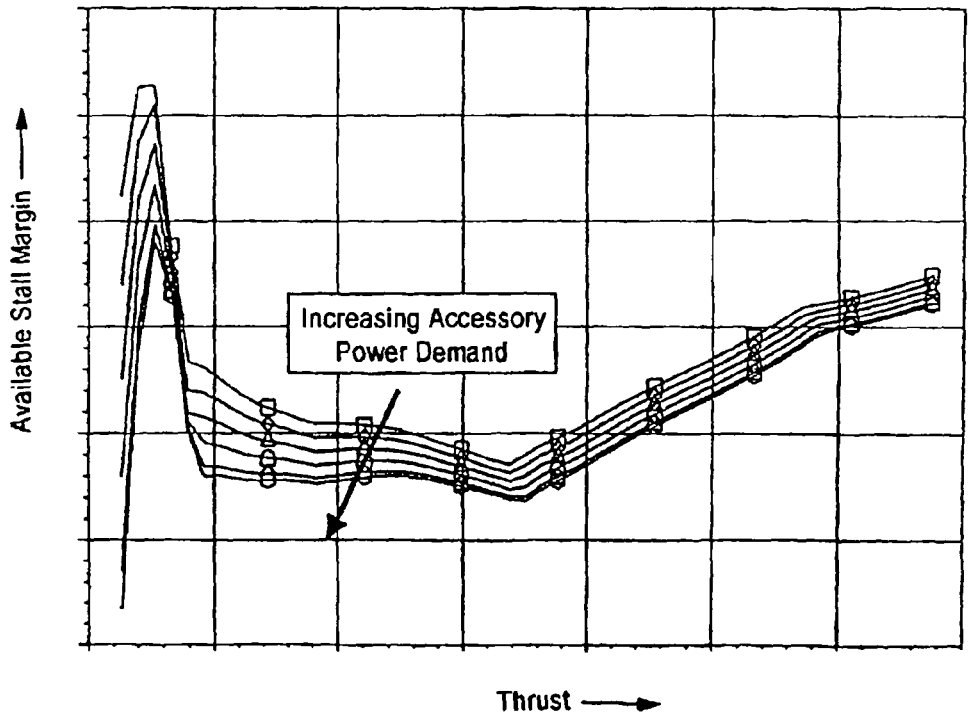
FIG. 2 is a graph of available stall margin vs. thrust for a gas turbine engine.

The present invention is directed to a hybrid mechanical/pneumatic accessory drive system which simultaneously allows for reduced mechanical shaft power load and systems capacity to absorb and utilize the energy of compressor bleed air at low power. By combining functions of several existing control and power generation components, engine transient operation can be improved or optimized. In the system of the present invention, the engine mounted power generation system may operate solely with mechanical power at normal steady state operating conditions and combination pneumatic and mechanical power during a transient state. As used herein, the term "transient state" refers to any change in power demand whether it be a change in engine power demand due to a change in engine state or a change in any mechanical or electrical power demand due to a change in any accessory state. In some flight regimes, it may be desirable to operate with a combination of pneumatic and mechanical power during steady state as well. By opening a compressor bleed during a transient state or at any other operating point, the operating line can be lowered, increasing the stall margin (point B in FIG. 1). The bleed air is directed to a pneumatically operated device which reduces demand for mechanical shaft power from the high pressure rotor of the gas turbine engine. Reducing mechanical power demand lowers the compressor operating line, further allowing a given transient excursion with improved stall margin as shown by line 18 in FIG. 1.

Figure 3:
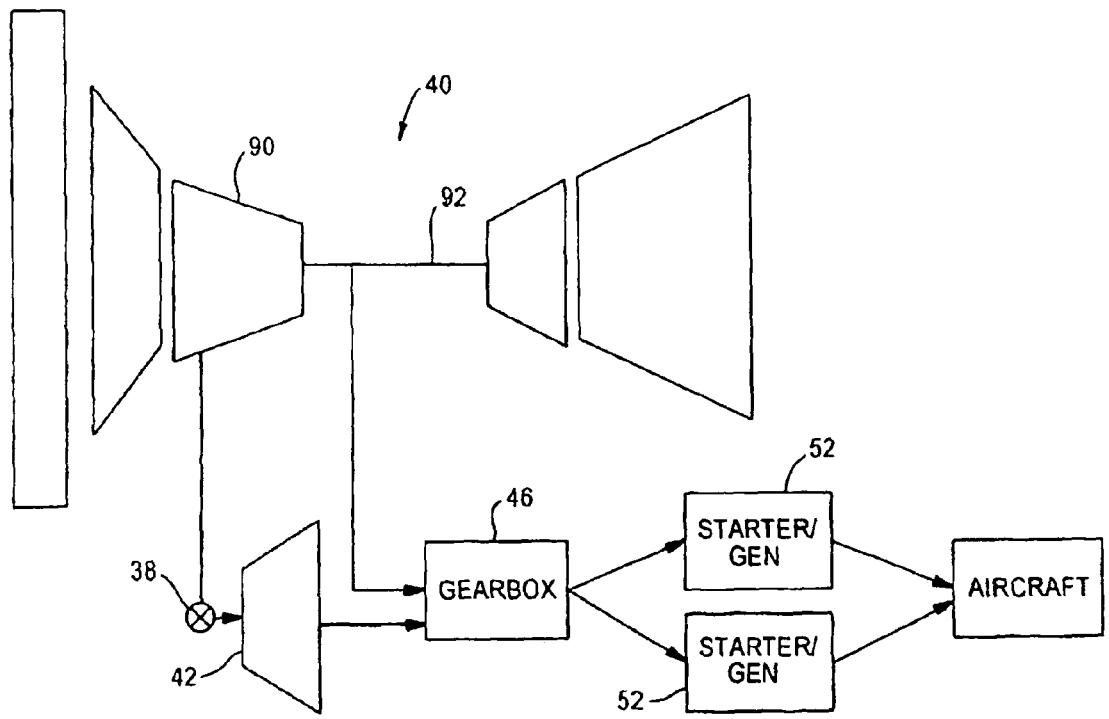
FIG. 3 is a schematic representation of an architecture for a hybrid engine accessory power system in accordance with the present invention.

FIG. 3 is a schematic representation of an architecture for a hybrid engine accessory power system in accordance with the present invention. The figure illustrates an engine 40 having a high pressure compressor 90 connected to a rotor shaft 92. Power from the rotor shaft 92 is delivered to a gearbox 46 through a mechanical take-off shaft (not shown). The gearbox 46 is used to generate power for driving accessory devices such as the starter/generators 52 and potentially other devices, such as another generator, that are not shown. The system also contains a pneumatically operated device 42 which as discussed below will be used to provide power to the gearbox 46 and/or the accessories to be driven. Also as discussed below, the device 42 will receive bleed air from the compressor 90 or another portion of the engine 40 during transient operation to relieve the load on the rotor shaft 92 and thereby increase the stall margin.

Figure 4:
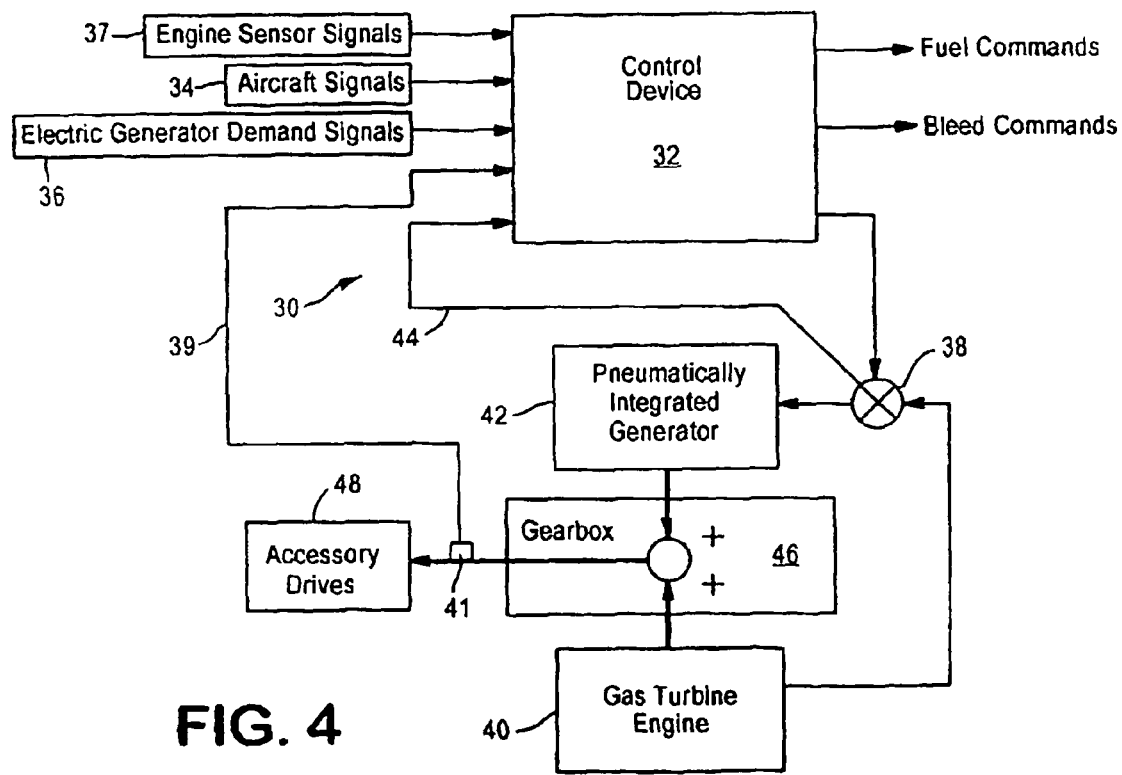
FIG. 4 is a schematic representation of a first embodiment of a hybrid engine accessory power system of the present invention.

Referring now to FIG. 4, a first embodiment of a hybrid engine accessory power system in accordance with the present invention is shown. As discussed, the system 30 may be used to modulate the steady state and transient behavior of a gas turbine engine or an accessory onboard an aircraft. The system 30 makes use of a pneumatic or an electronic control device 32. In a preferred embodiment, the control device 32 may be a full authority digital engine control device (FADEC); however, alternatively, the control device 32 may be a pneumatic control device which receives an input from a sensor indicating the need to offload gearbox torque and open up pneumatic power to a pneumatic turbine drive device. The device 32 may control engine fuel flow to modulate engine operation, including steady state and transient behavior, and may be any suitable FADEC device known in the art. The device 32 may also have the ability to control engine compressor bleeds during transients. The device 32 is provided with knowledge of gearbox generator power demand via one or more of the following methods of detection: (1) an inputted cockpit signal 34 which indicates aircraft power demand change; (2) an inputted signal 37 from an electric power generator control device indicating power demand change; (3) an inputted signal 39 representative of torque change on a drive shaft, such as the electric generator drive shaft, as sensed by a sensor 41, preferably mounted on the shaft, indicating power demand change; and/or (4) an inputted signal 36 representative of the power demand changes of one or more electrical generators. The inputted signal 36 could be a signal from a device for controlling the power being generated by the electrical generator(s) or a signal from a sensor monitoring the output of the electrical generator(s). Any or all of these signals indicate to the device 32 that an increase or decrease in power demand is incipient and thus a transient state is about to occur or is occurring.

The device 32 upon receiving a signal indicating a change in power demand, then transmits a signal to a valve 38 which causes the valve to open or modulate. When the valve 38 is opened, engine bleed air, such as bleed air from the compressor 90, such as the high pressure compressor, of the engine 40 or from another portion of the engine 40, is supplied to a pneumatically operated device 42 such as a pneumatically integrated generator. As part of the system of the present invention, a signal representative of valve position is transmitted to the device 32 via feedback loop 44.

The pneumatically operated device 42 may be any suitable device known in the art for delivering mechanical shaft power to the gearbox 46 to operate the drives 48 for such accessories as a fuel pump, deoiler, permanent magnet alternator (PMA), lube pump, hydraulic pump, generators and/or one or more starter/generators. Alternatively, the device 42 may be any suitable device known in the art for delivering electrical power to operate the drives for one or more of the aforementioned accessories or any other accessories that require power. Examples of suitable pneumatically operated devices which may be used for the device 42 include, but are not limited to, an air turbine, a pneumatically operated auxiliary power unit, a turbocharger, a pneumatic starter, a turbopump, and other pneumatically operated devices for generating power. The power, whether it be electrical or mechanical, that is delivered by the device 42 to drive the accessories accommodates any additional electrical generator load and reduces the power demand on the engine rotor shaft.

By utilizing the information available to the control device 32 regarding compressor bleed operation or scheduling and electrical generator load demand, the device 32 is able to control the pneumatic power extraction. Controlling pneumatic power extraction can reduce engine workload and improve compressor operating line surge margin.

Figure 5:
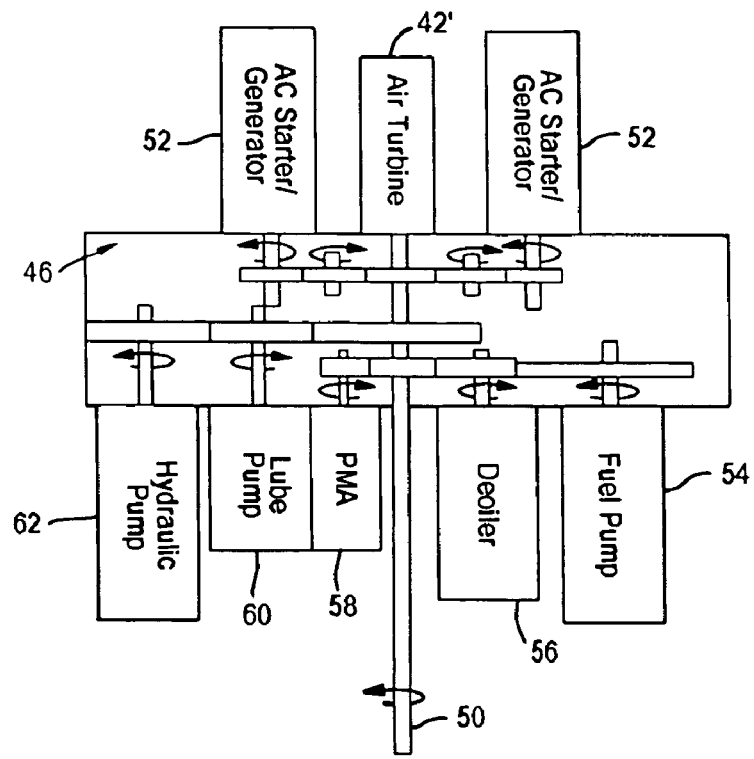
FIG. 5 is a schematic representation of a second embodiment of a hybrid engine accessory power system of the present invention.

In the embodiment of FIG. 5, the pneumatically operated device 42' is an air turbine mounted to the gearbox 46. The air turbine may be any suitable device known in the art for outputting mechanical power to be transmitted to the main gear shaft 50 in the gearbox 46 via any suitable means known in the art. As shown in this figure, the air turbine rotates the shaft 50 which is connected to a plurality of accessory devices via any suitable power transfer arrangement known in the art such as a gear and shaft arrangement. The accessory devices which may be driven in this manner include starter/generators 52, fuel pump 54, deoiler 56, PMA 58, lube pump 60, and hydraulic pump 62. One skilled in the art will appreciate that this or an equivalent arrangement may also be used to drive other mechanical devices, such as a generator.

As before, bleed air from the compressor 90 of engine 40 or another part of the engine 40 is supplied to the air turbine 42' via the operation of control valve 38 by the electronic control device 32.

Figure 6:
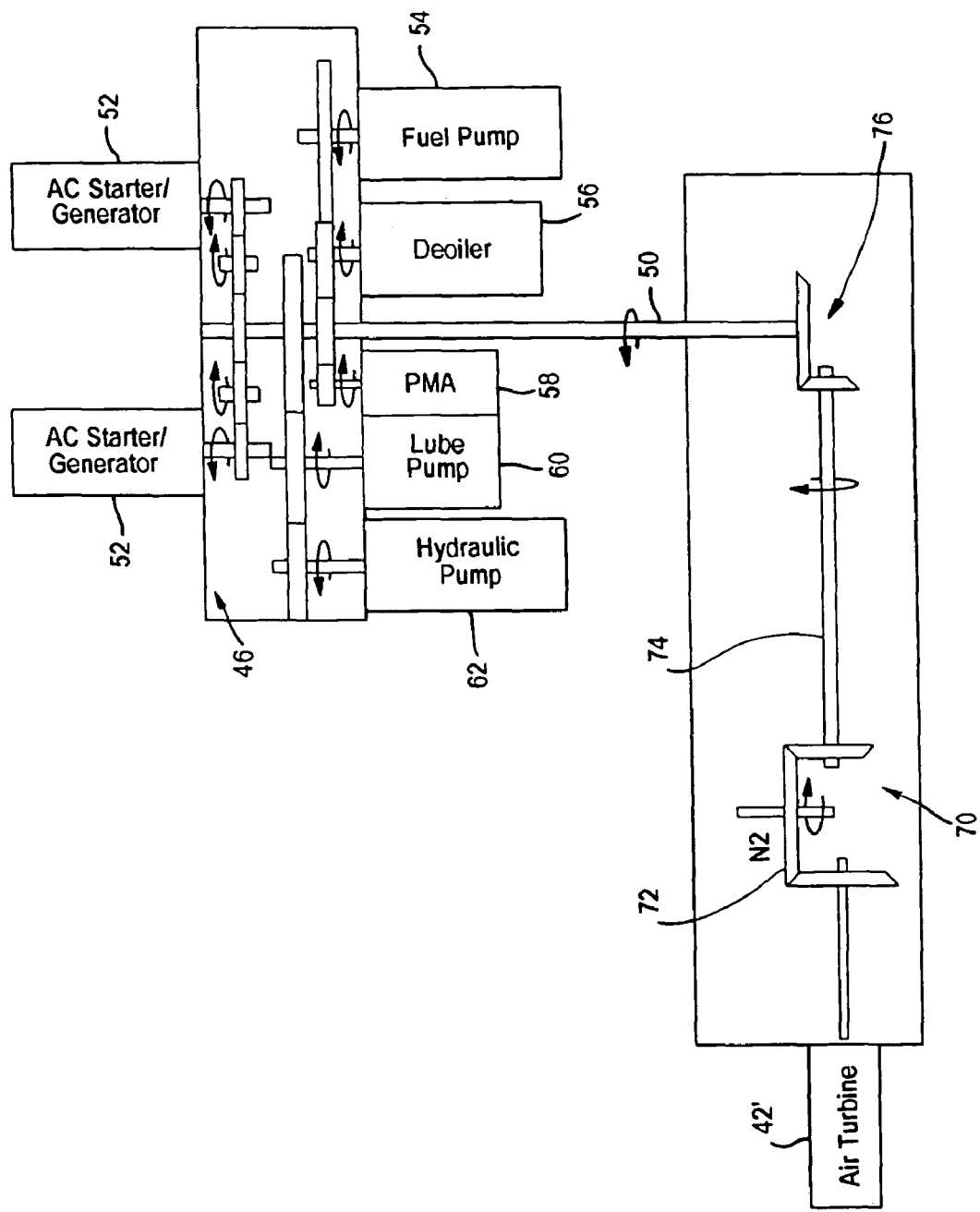
FIG. 6 is a schematic representation of a third embodiment of a hybrid engine accessory power system of the present invention.

FIG. 6 illustrates a variation of the system shown in FIG. 5. In this variation, the air turbine 42' is not mounted to the gearbox 46. Rather the air turbine 42' is mounted elsewhere on the aircraft and mechanical power from the air turbine 42' is delivered to the shaft 50 via a gear and shaft arrangement 70 including a bevel gear arrangement 72 and a tower shaft 74 connected to the shaft 50 by a gear arrangement 76. One skilled in the art will recognize that other arrangements will work as well and are suitable equivalents to the embodiments of the present invention described in this application.

Figure 7:
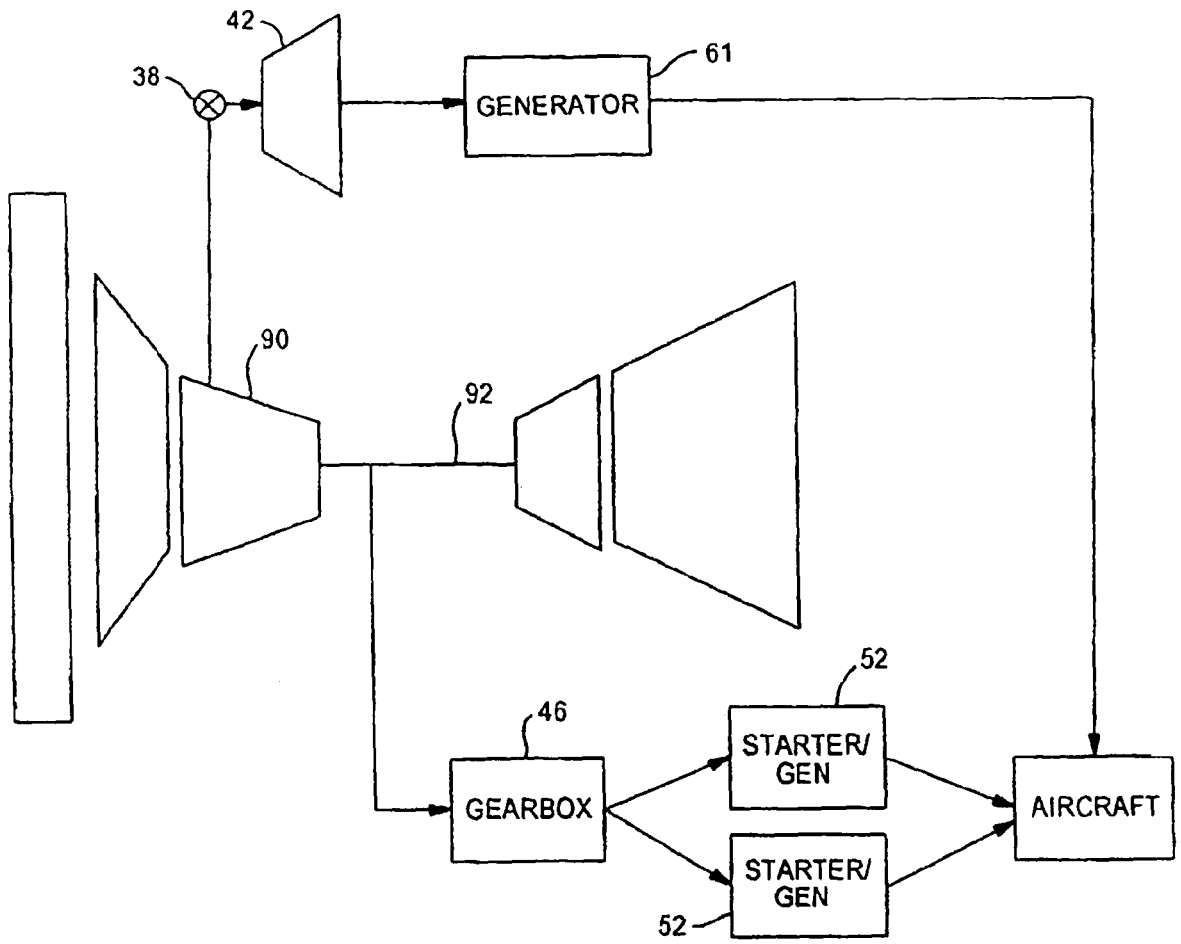
FIG. 7 is a schematic representation of a fourth embodiment of a hybrid engine accessory power system of the present invention.

FIG. 7 illustrates yet another variation of a hybrid engine accessory power drive in accordance with the present invention. In this variant, the air turbine 42 is not mounted to the gearbox 46. Rather, the air turbine 42 is mounted elsewhere on the aircraft. When needed, bleed air from the compressor 90 or some other portion of the gas turbine engine 40 is supplied to the air turbine 42 via valve 38. The valve 38 is operated or modulated as described hereinbefore by the electric control device 32. The air turbine 42 is driven so as to supply power to a generator 61. The power supplied to the generator 61 by air turbine 42 may be mechanical shaft power or electrical power depending upon the type of air turbine used. The electrical output of the generator 61 is then supplied to systems onboard the aircraft or any accessory onboard the aircraft requiring electrical power to operate the systems and/or accessory. One skilled in the art will recognize that other arrangements will work as well and are suitable equivalents of this variation of the hybrid engine accessory power system of the present invention.

Figure 8:
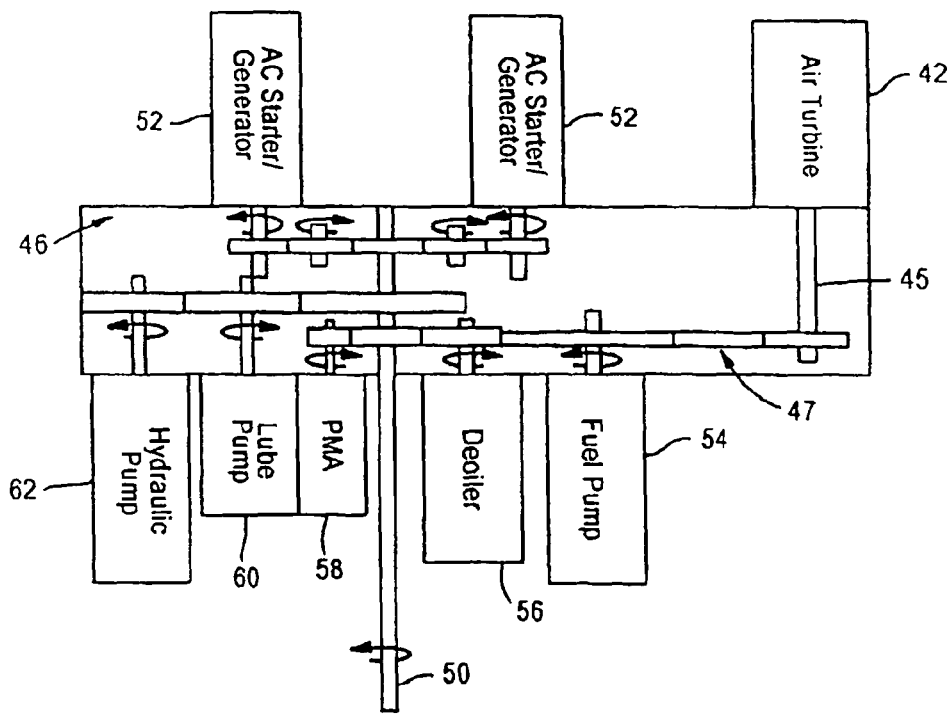
FIG. 8 is a schematic representation of a fifth embodiment of a hybrid engine accessory power system of the present invention.

FIG. 8 illustrates yet another embodiment of a hybrid engine accessory power system in accordance with the present invention. In this embodiment, an air turbine 42 is mounted to an end of a gearbox 46. The air turbine 42 drives a shaft 45 which in turn drives a shaft 50 and shafts connected to various accessories including, but not limited to, starter/generators 52, fuel pump 54, deoiler 56, PMA 58, lube pump 60, and hydraulic pump 62 via any suitable power transfer or gear arrangement 47 known in the art. If desired, the air turbine 42 may be used to provide power to other accessories, such as a generator, (not shown). As described hereinbefore, the flow of bleed air to the air turbine 42 is controlled by a valve (not shown) which is opened or modulated by an electronic control device 32 such as a FADEC. One skilled in the art will recognize that other arrangements will work as well and are suitable equivalents of this variation of the hybrid engine accessory power system of the present invention.

Figure 9:
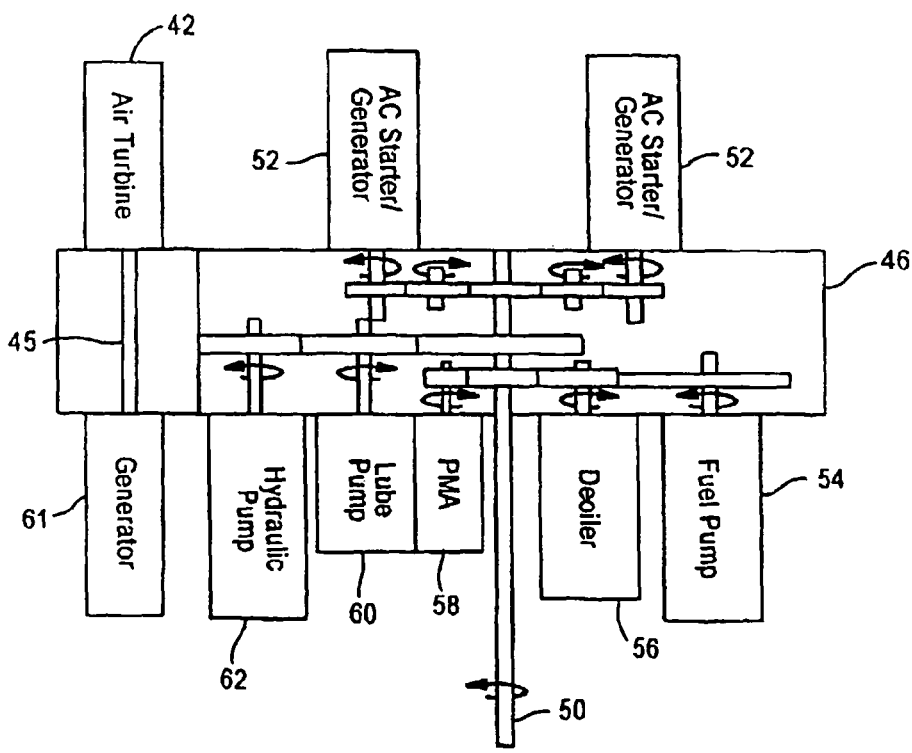
FIG. 9 is a schematic representation of a sixth embodiment of a hybrid engine accessory power system of the present invention.

FIG. 9 illustrates still another embodiment of a hybrid engine accessory power system in accordance with the present invention. In this embodiment, an air turbine 42 is mounted to an end of a gearbox 46. The air turbine 42 drives a shaft 45 for providing mechanical shaft power to a generator 61 that is also mounted to the end of the gearbox 46. The output of the generator 61 may be used to drive a wide variety of power systems or accessories onboard an aircraft. If desired, the output of the generator 61 may be used to provide power to various accessories including, but not limited to, starter/generators 52, fuel pump 54, deoiler 56, PMA 58, lube pump 60, and hydraulic pump 62 via any power transfer arrangement (not shown) known in the art. As described hereinbefore, the flow of bleed air to the air turbine 42 is controlled by a valve (not shown) which is opened or modulated by an electronic control device 32 such as a FADEC. One skilled in the art will recognize that other arrangements will work as well and are suitable equivalents of this variation of the hybrid engine accessory power system of the present invention.

Figure 10:
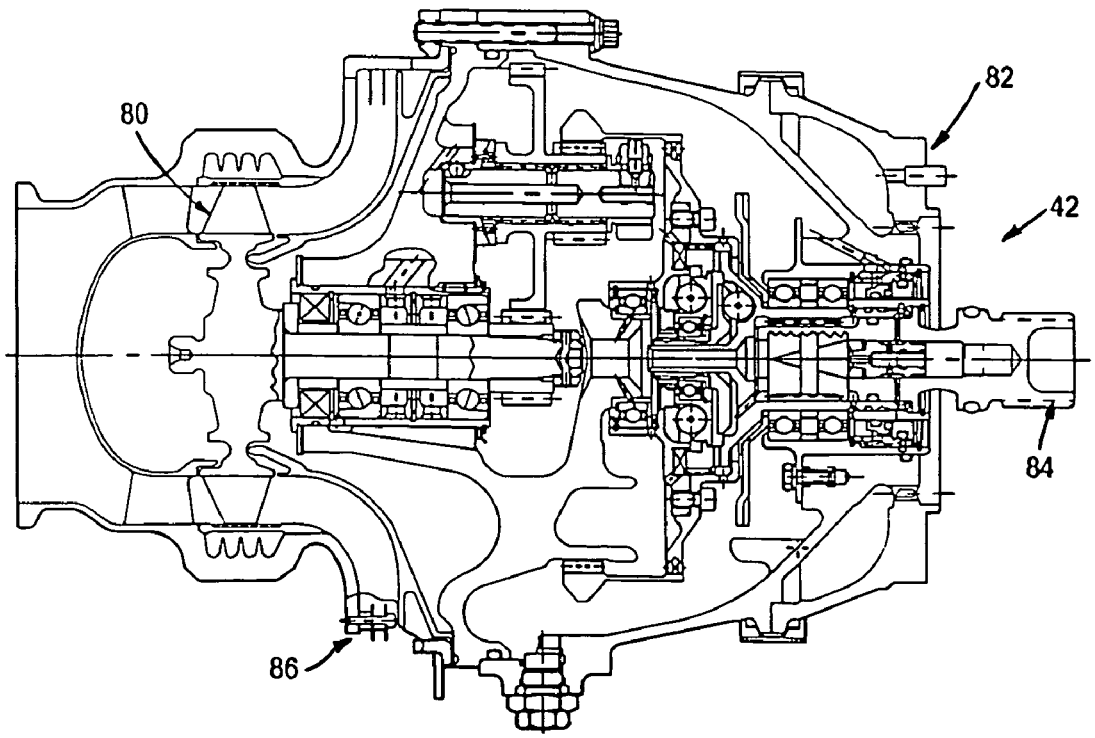
FIG. 10 is a sectional view of a pneumatically operated device for use in the various embodiments of the hybrid engine accessory power system of the present invention.

FIG. 10 illustrates a pneumatically operated device 42 which can be used in any of the hybrid engine accessory power systems of the present invention. The device 42 is a pneumatic turbine drive device having a turbine 80. The device 42 may be mounted to a gearbox, if desired, via a flange 82. Mechanical power generated by the device 42 may be delivered to a shaft via the spline 84. One advantage to using this system is that the exhaust flow leaving the outlet 86 may be exhausted into an under cowl area, overboard into a fan duct, into the core exhaust region of the engine, or into some other location. Another advantage is that by expanding the bleed air exhaust through a drive system, the exhaust temperature and velocity can be reduced thereby reducing exhaust noise and improving the compatibility with engine cowl structures.

In general, all of the systems of FIGS. 4-9 operate in the following way. During a change in engine steady state, such as a deceleration of the engine below a prescribed engine high rotor speed, or during a change in accessory power demand, the control device 32 commands the engine bleed system open. The bleed air is directed to the pneumatically operated device 42 or 42', which in turn produces supplementary accessory drive power, either mechanical or electrical. Once a minimum surge margin point in the acceleration characteristic is passed, the engine bleed system can be closed, thereby improving engine performance.

The hybrid engine accessory power systems of the present invention may be used with any gas turbine engine including, but not limited to, single-spool, 2-spool, and/or 3-spool gas turbine engines.

It is apparent that there has been provided in accordance with the present invention a hybrid engine accessory power system which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A system for generating accessory power from a gas turbine engine, said system comprising:
    a means for sensing torque change torque change on a shaft between a gearbox and an accessory drive which is indicative of a power demand change;
    a full authority digital engine control device;
    means for supplying information about said sensed torque change to said full authority digital engine control device;
    means for supplying bleed air from said engine during a transient state in response to said sensed torque changes; and
    a pneumatically operated means for receiving said bleed air and for generating shaft power to operate equipment onboard an aircraft and to reduce demand for shaft power from a rotor drive shaft of the engine, thereby increasing stall margin available to a high pressure compressor of said engine.

2. A system for generating accessory power from a gas turbine engine, said system comprising:

a sensor detecting torque change on a shaft between a gearbox and an accessory drive to indicate a power demand change;

a full authority digital engine control device;

means for supplying a signal indicative of said sensed torque change from said sensor to said full authority digital engine control device;

means for supplying bleed air from said engine during a transient state in response to said sensed torque changes; and a pneumatically operated means for receiving said bleed air and for generating shaft power to operate equipment onboard an aircraft and to reduce demand for shaft power from a rotor drive shaft of the engine, thereby increasing stall margin available to a high pressure compressor of said engine.

3. A system according to claim 2, wherein said bleed air supply means comprises a control valve which is opened or modulated by a signal from said electronic engine control device.

4. A system according to claim 3, wherein said control valve in an open position allows bleed air from a high pressure compressor of said engine to flow to said pneumatically operated means.

5. A system according to claim 3, further comprising a feedback loop for transmitting a signal to said full authority digital engine control device representative of control valve position.

6. A system according to claim 2, wherein said pneumatically operated means comprises a pneumatically integrated generator for supplying electrical power to operate at least one accessory selected from the group consisting of a generator, a starter/generator, a fuel pump, a deoiler, a PMA, a lube pump, and a hydraulic pump.

7. A system according to claim 2, wherein said pneumatically operated means comprises a pneumatically integrated generator for supplying mechanical power to a gearbox for operating at least one accessory selected from the group consisting of a generator, a starter/generator, a fuel pump, a deoiler, a PMA, a lube pump, and a hydraulic pump.

8. A system according to claim 2, wherein said pneumatically operated means comprises an air turbine connected to a gearbox and further comprising a generator attached to said gearbox and being driven by said air turbine.

9. A system according to claim 2, wherein said pneumatically operated means comprises a bleed air turbine and further comprising a generator driven by said air bleed air turbine for supplying power to at least one system onboard an aircraft.

* * * * *